United States Patent
Chen et al.

(10) Patent No.: US 9,809,243 B2
(45) Date of Patent: Nov. 7, 2017

(54) FRAME STRUCTURE AND TROLLEY USING FRAME STRUCTURE

(71) Applicant: CHIGOO INTERACTIVE TECHNOLOGY CO., LTD., Wuxi, Jiangsu (CN)

(72) Inventors: Tao Chen, Wuxi (CN); Chuanrong Pan, Wuxi (CN); Weijian Lan, Wuxi (CN); Hua Zhou, Wuxi (CN); Yong Yang, Wuxi (CN); Rong Han, Wuxi (CN)

(73) Assignee: Chigoo Interactive Technology Co., Ltd., Wuxi, Jiangsu (CN)

( * ) Notice: Subject to any disclaimer, the term of this patent is extended or adjusted under 35 U.S.C. 154(b) by 0 days.

(21) Appl. No.: 15/026,040

(22) PCT Filed: Aug. 26, 2014

(86) PCT No.: PCT/CN2014/085175
§ 371 (c)(1),
(2) Date: Mar. 30, 2016

(87) PCT Pub. No.: WO2015/043348
PCT Pub. Date: Apr. 2, 2015

(65) Prior Publication Data
US 2016/0244083 A1    Aug. 25, 2016

(30) Foreign Application Priority Data
Sep. 30, 2013 (CN) .................... 2013 2 0613943 U

(51) Int. Cl.
*B62B 5/00* (2006.01)
*B62B 3/14* (2006.01)
*H01R 13/627* (2006.01)

(52) U.S. Cl.
CPC .................. *B62B 5/00* (2013.01); *B62B 3/14* (2013.01); *B62B 3/1404* (2013.01); *B62B 3/1424* (2013.01); *H01R 13/6275* (2013.01)

(58) Field of Classification Search
CPC ....... B62B 3/001; B62B 2205/14; B62B 5/00; B62B 3/14; B62B 3/1404; B62B 3/1424
See application file for complete search history.

(56) References Cited

U.S. PATENT DOCUMENTS 4,719,513 A * 1/1988 Peterson .............. H04N 9/3141
                                                       312/114
5,769,435 A    6/1998 Nishida
(Continued)

FOREIGN PATENT DOCUMENTS

CN    201882122 U    6/2011
CN    203071613 U    7/2013
(Continued)

OTHER PUBLICATIONS

International Search Report (in English and Chinese) and Written Opinion of the International Searching Authority (in Chinese) for PCT/CN2014/085175, dated Oct. 29, 2014; ISA/CN.
(Continued)

*Primary Examiner* — Hau Phan
(74) *Attorney, Agent, or Firm* — Stephen T. Olson; Harness, Dickey & Pierce, P.L.C.

(57) ABSTRACT

A frame structure includes a frame body and an auxiliary frame fixedly connected to the frame body. The frame body has a front bracket and a frame base. The lower end of the front bracket does not connect with the frame base. The upper end portion of the auxiliary frame is connected to the front bracket of the frame body, and the lower end of the auxiliary frame is connected to the frame base at the rear of front wheels of the frame. A trolley with the frame structure
(Continued)

can prevent it from leaning forward or overturning, which increases security and stability.

10 Claims, 4 Drawing Sheets

(56) References Cited

U.S. PATENT DOCUMENTS

| | | | | |
|---|---|---|---|---|
| 6,968,067 | B2* | 11/2005 | Lopez | H04R 5/02 |
| | | | | 381/182 |
| 7,620,475 | B1* | 11/2009 | Bottazzi | G06Q 20/343 |
| | | | | 235/383 |
| 8,944,441 | B2* | 2/2015 | Araya Moreno | B62B 3/001 |
| | | | | 280/33.992 |
| 2012/0267867 | A1* | 10/2012 | Araya Moreno | B62B 3/001 |
| | | | | 280/47.11 |

FOREIGN PATENT DOCUMENTS

| | | |
|---|---|---|
| CN | 203103711 U | 7/2013 |
| CN | 203472905 U | 3/2014 |
| CN | 203481526 U | 3/2014 |
| CN | 203496964 U | 3/2014 |
| CN | 203503922 U | 3/2014 |

OTHER PUBLICATIONS

First Office Action (with English summary) dated Jun. 14, 2017 regarding counterpart Korean Application No. 10-2016-7011559 (7 pages).

* cited by examiner

FRAME STRUCTURE AND TROLLEY USING FRAME STRUCTURE

CROSS-REFERENCE TO RELATED APPLICATIONS

This application is a 371 U.S. National Stage of International Application No. PCT/CN2014/085175, filed Aug. 26, 2014, which claims the benefit of and priority to Chinese Patent Application No. 201320613943.2, filed Sep. 30, 2013. The disclosures of the above applications are incorporated herein by reference.

TECHNICAL FIELD

The invention relates generally to vehicles, and in particular to a frame structure used in a vehicle such as a trolley, and a vehicle using the frame structure.

BACKGROUND ART

In the large area of airports or other public places, it is difficult to quickly find or reach a destination. Small vehicle, such as a multimedia trolley equipped with intelligent mobile service terminal or the like, is provided to facilitate the delivery of articles. However, during use of the existing multimedia trolley, it may be necessary to brake timely when encountering obstacles such as people or luggage. If a lot of luggage placed on the trolley, a sudden brake will cause the trolley leaning forward and even overturning due to an unsteady center of gravity of the trolley. In addition, battery of the mobile service terminal of a trolley needs to be charged frequently due to frequent use of multimedia, thereby reducing the usage of the trolley, while causing inconvenience to the users who is in urgent need of the multimedia trolley.

SUMMARY OF THE INVENTION

An object of the invention is to provide a frame structure and a vehicle using the frame structure to solve at least one of the above defects in the conventional art.

According to one aspect of the present invention, there is provided a frame structure comprising a frame body and an auxiliary frame. The frame body comprises a front bracket and a frame base, the lower end of the front bracket and the frame base are not connected. The auxiliary frame is fixedly connected to the frame body, the upper end portion of the auxiliary frame is connected to the front bracket of the frame body, and the lower end of the auxiliary frame is connected to the frame base at the rear of front wheels of the frame at a predetermined angle α. The frame structure increases the safety and the stability of the trolley. When a user uses a trolley with the frame structure, a force delivered to the front end of the base from the handle of the trolley through the front bracket can be controlled so as to prevent the trolley from leaning forward or even overturning.

In some embodiments, the auxiliary frame is formed into a curved shape. The angle α between the lower end portion of the auxiliary frame and the frame base is smaller than 45°, and can be slightly adjusted according to the weight of the rear end of the trolley. The smaller the angle α is, the less easy it would be for the trolley to lean forward or overturn. The connection position of the lower end of the auxiliary frame and the frame base is preferably positioned between the front wheels and rear wheels. In addition, an angle formed between the lower end of the auxiliary frame and the frame base may increase with increasing of a distance between the portion where the lower end portion of the auxiliary frame connects with the frame base and the front wheels. However, the angle will not exceed 90°.

In some embodiments, the frame structure may further include a connector provided below the frame base, thus facilitating the storage and management of multiple trolleys.

In some embodiments, the connector is provided with first to fourth hooks. The first and the third hooks can cooperate with each other so that a first hook of a frame structure can connect to a third hook of another frame structure when the two frame structures are stacked together; and the second and fourth hooks can cooperate with each other so that a second hook of one frame structure can connect to a fourth hook of another frame structure when the two frame structures are stacked together. The cooperation between the hooks of the adjacent frames can achieve self-locking between the connectors.

In some embodiments, the first hook and fourth hook of a connector are formed like a seesaw. The two hooks are connected via a fulcrum with different length of lever arms. When in a free status, the end of the hook with longer lever arm hangs down, and the end of the hook with short lever arm is lifted up.

In some embodiments, the first hook of the connector has a slant surface or an elastic slant surface to facilitate its detaching from the second hook.

Such a hook structure of the connector can achieve a series connection and lock of multiple trolleys via the connector to facilitate storage of and access to the trolleys by the user.

According to another aspect of the present invention, a trolley with the above frame structure is provided. The trolley comprises a multimedia player, a vehicle power supply and a charging connector provided in the frame structure. The charging connector is provided under the base of the frame body, which allows charging multiple trolleys simultaneously, thereby improving usage of the trolley and saving time for users.

DETAILED DESCRIPTION OF EMBODIMENTS

Embodiments of the present invention will be further described in detail in conjunction with the drawings as follows.

Figure 1:
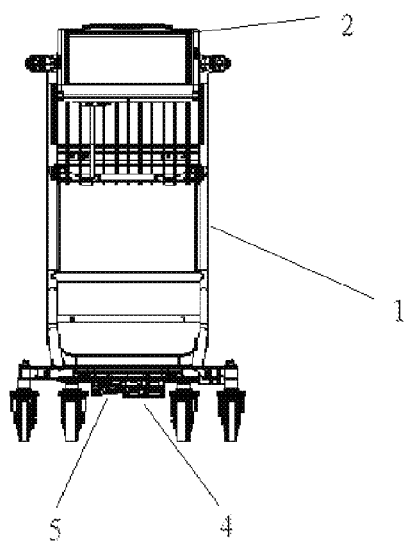
FIG. 1 is a schematic view showing a front side of a trolley according to an embodiment of the present invention.

FIG. 1 is a schematic view of a front side of a trolley according to an embodiment of the present invention. FIG. 2(a) and FIG. 2(b) are schematic views of the right side of two kinds of trolleys respectively, which use the frame structure of the present invention. As shown in FIG. 2(a) and FIG. 2(b), the frame structure comprises a frame body 1 and an auxiliary frame 6. The frame body 1 comprises a front bracket 11 and a frame base 12. The lower end of the front bracket 11 does not connect with the frame base 12. The upper end portion of the auxiliary frame 6 parallels to the front bracket 11 of the frame body 1 by employing a fixed connection such as welding or the like. The lower end portion of the auxiliary frame 6 is fixedly connected to the frame base 12 by welding or the like, with an angle α being formed between the lower end portion of the auxiliary frame 6 and the frame base 12. In a preferred embodiment, as shown in FIG. 2(a), α is smaller than 45°, and can be slightly adjusted according to the weight of the rear end of the trolley in the design. The smaller α is, the less liable the trolley is to lean forward or overturn. According to another embodiment, a predetermined angle formed between the lower end of the auxiliary frame and the frame base can increase with a distance from the connection portion of the lower end portion of the auxiliary frame and the frame base to the front wheels, and the predetermined angle can increase to no more than 90°, as shown in FIG. 2(b).

Figure 2:
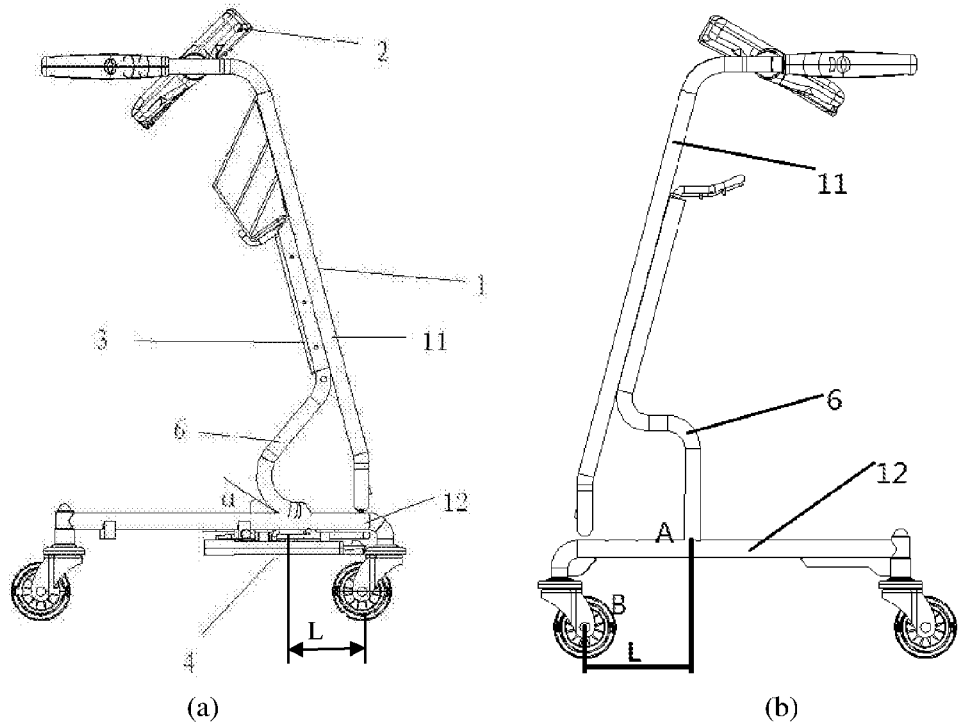
FIG. 2(a) is a schematic view showing a right side of a trolley according to an embodiment of the present invention.
FIG. 2(b) is a schematic view of a right side of a trolley according to another embodiment of the present invention.
Figure 3:
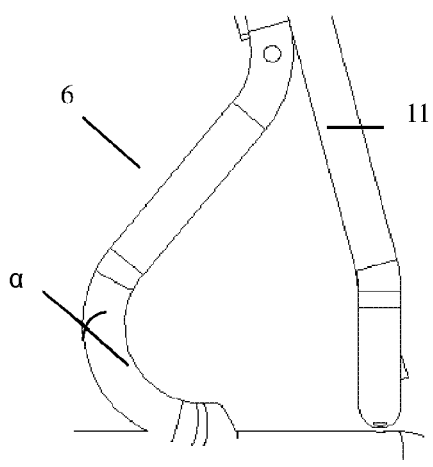
FIG. 3 is a partially enlarged schematic view of the auxiliary frame of the trolley shown in FIG. 2.

FIG. 3 schematically shows a partially enlarged view of the lower end portion of the auxiliary frame 6 of the trolley shown in FIG. 2. The frame body 1 is not connected to the frame base 12. A tangent line of the lower end arc portion of the auxiliary frame 6 and the frame base 12 of the trolley forms the angle α. Such a structure can prevent the trolley from leaning forward or overturning.

Figure 4:
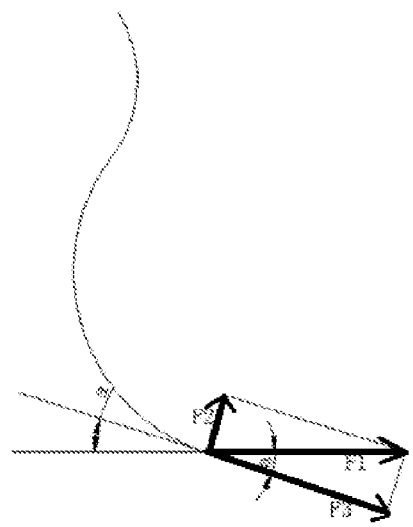
FIG. 4 schematically shows forces applied on a connection portion of the auxiliary frame and the frame base shown in FIG. 3.

FIG. 4 schematically shows forces applied on the connection portion of the auxiliary frame and the frame base shown in FIG. 3. As shown in FIG. 4, F1 represents a force which drives the trolley forward (i.e., the force acting on the trolley when user pushes the trolley). F2 represents the force exerted on the front end of the frame base 12 being delivered along the front bracket 11 from the force exerted on the handle. F3 is a component of force F1 which is not directly relevant with the effect of this structure and will not be described in detail. With the above structure, when the force F1 is determined, the larger the angle α is, the greater the F2 is. That is, the force exerted on the front end of the frame base 12 being delivered along the front bracket 11 is greater. At this time, the trolley is easy to lean forward or overturn. Thus, the angle α should be restricted within the range of 0° to 45°.

The angle formed between the line from the end of the handle to the front wheels of an existing trolley and the ground is big, generally more than 45°, or even to 60°, which is easy to cause overturning of the trolley. To solve this problem, a conventional method is to extend the length of the handle, thus the angle formed between the line extending from the end of the handle to the front wheels and the ground is less than 45°. However, the increased length of the handle affects the appearance and usability and introduces a new problem of backward leaning of vehicle. Thus, in an embodiment of the present invention, an auxiliary frame is introduced to prevent the frame from leaning forward no overturning. As shown in FIG. 2, the auxiliary frame is formed into a curved shape, the lower end portion of which is shaped as an arc and is connected to the frame base at the rear of the front wheels of the frame and between the front and rear wheels with a distance L from the front wheels.

When a trolley is being pushed forward, a vigorous push by the user may cause the trolley to lean forward and overturn. When a pushing stroke is less than or equal to 90 CM (equivalent to a maximum length of a human's arm), the front wheels become the pivot of the front portion of the frame, while the pushing force acts on the connection portion of the lower end of the auxiliary frame and the frame base. Thus, the gravity center of the body is still behind the front wheels to prevent the trolley from leaning forward and overturning.

Figure 5:
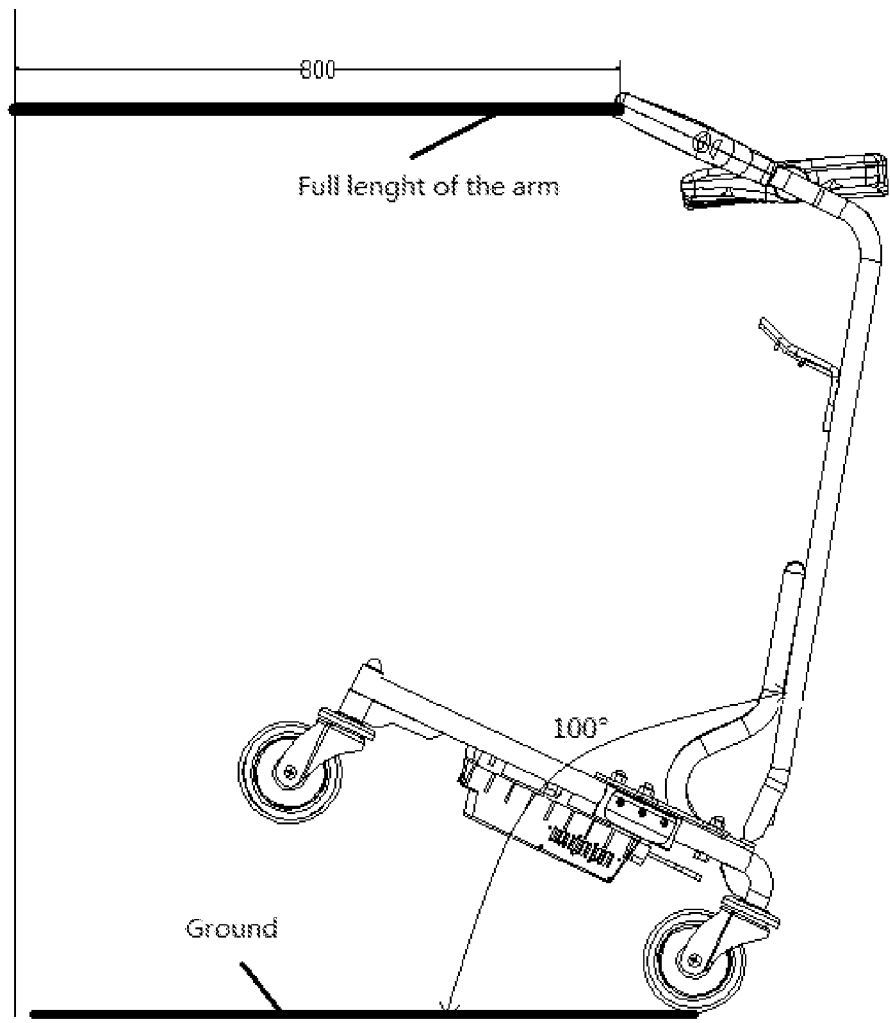
FIG. 5 is a schematic view illustrating an effect of preventing the trolley with the frame structure from leaning forward according to an embodiment of the invention.

That is, since the auxiliary frame and the frame base are connected at the rear of the front wheels at an angle α, the lower end of the auxiliary frame is formed into an arc shape, and the front wheel contact point is a pivot, when the external force makes the trolley to lean forward to 100° (as shown in FIG. 5, the front bracket and the ground form an angle of 100°), the trolley will not overturn, but return to its normal status after the force is released.

Figure 6:
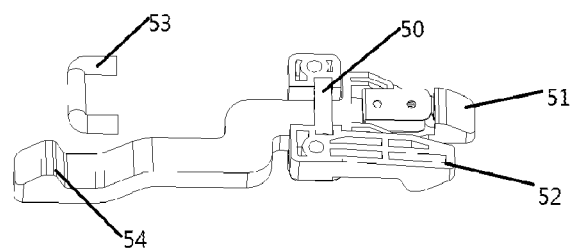
FIG. 6 is a perspective view of the connector of the frame structure according to an embodiment of the present invention.
Figure 7:
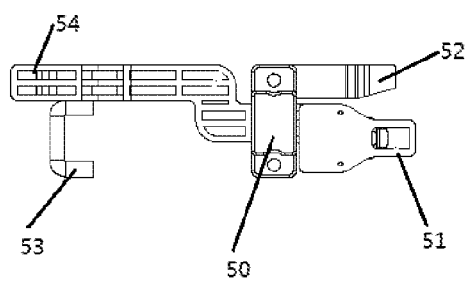
FIG. 7 is a bottom view of the connector shown in FIG. 6.

FIG. 6 and FIG. 7 schematically show a connector 5 of the frame structure according to an embodiment of the present invention. The connector 5 is located below the frame base 12, and consists of four different hooks 51, 52, 53 and 54. Wherein the first hook 51 and the third hook 53 are configured to cooperate with each other, so that when two vehicles are stacked together, the first hook 51 of the connector 5 of the first vehicle C1 is able to hook on the third hook 53 of the connector 5 of the second vehicle C2 (see FIG. 7). The cooperation structure of the first hook 51 and the third hook 53 can employ a conventional lock structure. As shown in FIG. 6, the first hook 51 is formed into a wedge-shaped projection, and the third hook 53 is formed into a 'П' shape, and fixedly connected onto the frame base 2. When two vehicles stacked together, the first hook 51 of the first vehicle C1 is first depressed by the third hook 53 of the second vehicle C2, then the rear of the wedge-shaped projection of the first hook 51 bears against the bottom of the 'П' shaped portion of the third hook 53 of the second vehicle C2. At this time, the second hook 52, the third 53 and the fourth hook 54 of the first vehicle C1 are under the free status.

The fourth hook 54 and the second hook 52 are formed to have a hook-up structure as well. As shown in FIG. 6, the end of the second hook 52 is formed with a projection downward with its longitudinal section having a substantially triangular shape, while the end of the fourth hook 54 is formed with a projection upward with a longitudinal section having a substantially triangular shape. The first hook 51 and the fourth hook 54 of the same vehicle are connected with each other at a pivot 50 by employing a seesaw constructive principle. That is, when the first hook 51 is drooped at one side of the pivot 50, the fourth hook 54 is elevated at the other side. Since the arm length of the fourth hook 54 is longer than the arm length of the first hook 51, the two hooks form an unbalanced lever. Under a free status, the fourth hook 54 droops, and the first hook 51 is elevated.

Figure 8:
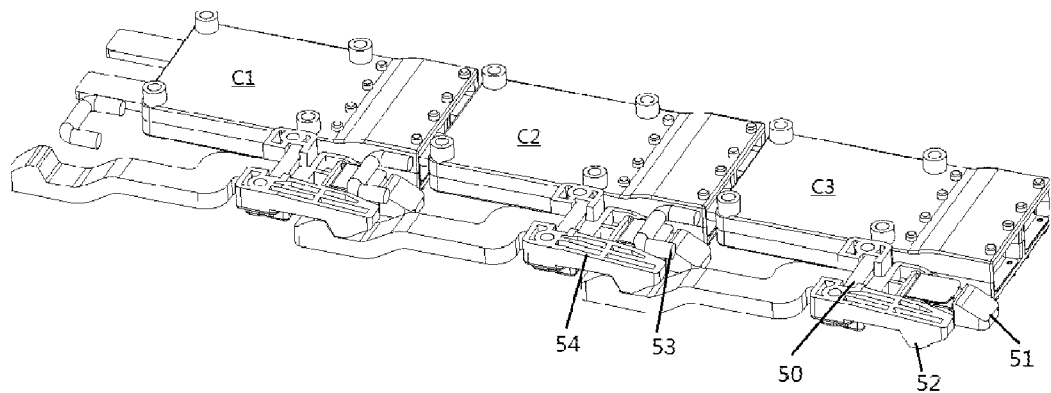
FIG. 8 is a schematic view showing a connection state of a plurality of connectors according to an embodiment of the present invention.

FIG. 8 shows schematically connectors in an interconnected state according to an embodiment of the present invention. For purposes of illustration, numerals C1, C2, C3 and C4 are marked on the connector and trolleys are omitted.

When the third vehicle C3 is pushed to stack with the second vehicle C2, the third hook 53 on the connector 5 of the third vehicle C3 automatically hooks to the first hook 51 on the connector 5 of the second vehicle C2. At this time, the first hook 51 on the connector 5 of the second vehicle C2 lowers due to a downward pressing force from the third hook 53 on the connector 5 of the third vehicle C3. Meanwhile, because of force transmission, the fourth hook 54 on the connector 5 of the second vehicle C2 will be elevated and automatically lock the second hook 52 on the connector 5 of the first vehicle C1 according to seesaw principle, which can avoid a simultaneous drawing out of the second vehicle C2 while the third vehicle C3 is pulled out. The third vehicle C3 can be pulled out without great force due to the slant structure of the first hook 51. That is, at this time the third hook 53 on the connector 5 of the third vehicle C3 detaches from the first hook 51 on the connector 5 of the second vehicle C2. The first hook 51 of the second vehicle C2 is no longer subject to a downward pressure. The fourth hook 54 on the connector 5 of the second vehicle C2 returns to a free drooping state due to gravity, thus the second vehicle C2 is unlocked. At this time, a second vehicle C2 is the last vehicle for coming use. Preferably, the slant surface of the first hook 51 may be formed as a movable spring piece, e.g., a piece with a spring being disposed underneath, so that the slant piece can be easily pressed to facilitate pulling out of a trolley.

The above process can be repeated for stacking more than three vehicles so that the last vehicle and the penultimate vehicle are always unlocked, with only a connection formed by the hook of the connector, which facilitates the users to pull out the last vehicle. After that, the penultimate vehicle becomes the last vehicle in queue and automatically unlocks.

The present application also provides a trolley using the frame structure as shown in FIGS. 1-2. The trolley comprises multimedia player 2, vehicle power supply 3 and a charging connector seat 4. The charging connector seat is provided under frame base 12 of the frame body 1, and is connected to the connector 5 for connecting a charging device of the trolley to an external power supply. The charging connector seat 4 may be implemented with the electrical connector as disclosed in Chinese Utility Model Patent No. 201320013022.2 of the same applicant.

What is claimed is:

1. A frame structure comprising:
   a frame body having a front bracket and a frame base; and
   an auxiliary frame fixedly connected to the frame body, an upper end portion of the auxiliary frame being connected to the front bracket of the frame body, and a lower end of the auxiliary frame being connected to the frame base at the rear of the front wheels of the frame; and
   a connector located below the frame base and configured to connect to a charging connector seat, the connector including first, second, third and fourth hooks, the first and the third hooks being configured to cooperate with each other so that a first hook of a frame structure is connectable to a third hook of another frame structure when the frame structure and the another frame structure stacked together, and the second and fourth hooks being configured to cooperate with each other so that a second hook of a frame structure is connectable to a fourth hook of the another frame structure when the frame structure and the another frame structure are stacked together.

2. The frame structure according to claim 1, wherein the auxiliary frame is formed into a curved shape, with an angle α formed between the lower end of the auxiliary frame and the frame base being smaller than 45°; and/or
   the angle formed between the lower end of the auxiliary frame and the frame base increases with an increasing of a distance between a position where the lower end portion of the auxiliary frame connect to the frame base and the front wheels, and the angle does not exceed 90°.

3. The frame structure according to claim 1, wherein the frame base is connected to front and rear wheels, the lower end of the auxiliary frame connects to the frame base at a position between the front wheels and rear wheels.

4. The frame structure according to claim 1, wherein the first hook and the fourth hook are formed as a seesaw structure.

5. The frame structure according to claim 4, wherein the arm length of the fourth hook is greater than the arm length of the first hook so that the fourth hook droops while the first hook elevates under a free status.

6. The frame structure according to claim 5, wherein the first hook has one of a slant and an elastic slant surface to facilitate detaching from the third hook.

7. The frame structure according to claim 4, wherein the first hook has one of a slant and an elastic slant surface to facilitate detaching from the third hook.

8. The frame structure according to claim 1, wherein the first hook has one of a slant and an elastic slant surface to facilitate detaching from the third hook.

9. A trolley with the frame structure according to claim 1, the trolley comprising:
   a multimedia player installed on the frame structure;
   a vehicle power supply; and
   a charging connector seat located under the base of the frame body.

10. The frame structure according to claim 1, wherein a lower end of the front bracket and the frame are indirectly connected.

* * * * *